(12) United States Patent
Schiel et al.

(10) Patent No.: US 9,033,182 B2
(45) Date of Patent: May 19, 2015

(54) COMPENSATION TANK FOR HYDRAULIC MOTOR VEHICLE BRAKE SYSTEMS

(75) Inventors: Christoph Schiel, Bad Nauheim (DE); Peter Tandler, Kronberg/Ts. (DE); Hans-Jürgen Neumann, Rüsselsheim (DE); Swen Ottmann, Frankfurt (DE); Werner Krebs, Hambach (DE); Stephan Schlicht, Nauheim (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 13/991,669

(22) PCT Filed: Nov. 29, 2011

(86) PCT No.: PCT/EP2011/071224
§ 371 (c)(1),
(2), (4) Date: Aug. 19, 2013

(87) PCT Pub. No.: WO2012/076359
PCT Pub. Date: Jun. 14, 2012

(65) Prior Publication Data
US 2013/0320016 A1    Dec. 5, 2013

(30) Foreign Application Priority Data

Dec. 8, 2010 (DE) .......................... 10 2010 062 619
Oct. 12, 2011 (DE) .......................... 10 2011 084 308

(51) Int. Cl.
*B60T 11/26* (2006.01)
*F17C 13/06* (2006.01)
*B65D 51/16* (2006.01)

(52) U.S. Cl.
CPC ............. *B60T 11/26* (2013.01); *B65D 51/1622* (2013.01); *B65D 51/1605* (2013.01)

(58) Field of Classification Search
CPC ..... B60T 11/26; B60T 11/20; B65D 51/1622; B65D 51/1611; B65D 51/1605; B65D 51/16; B65D 90/34; B65D 90/32
USPC ............... 220/582, 562, 581, 4.12, 4.14, 298, 220/301, 296, 293, 288; 215/316, 329, 331, 215/314, 311, 310, 307; 141/95
See application file for complete search history.

(56) References Cited

U.S. PATENT DOCUMENTS 3,435,978 A    4/1969  Wittwer
3,664,540 A *  5/1972  Witkin ........................ 220/288
(Continued)

FOREIGN PATENT DOCUMENTS

DE    37 34 421 A1    4/1989
DE    42 09 534 A1   10/1992

OTHER PUBLICATIONS

International Search Report for PCT/EP2011/071224 mailed May 4, 2012.
(Continued)

*Primary Examiner* — Robert J Hicks
*Assistant Examiner* — Kareen Rush
(74) *Attorney, Agent, or Firm* — RatnerPrestia

(57) ABSTRACT

A compensation tank for hydraulic motor vehicle brake systems, including a tank housing having at least one pressure medium chamber which can be filled with pressure medium via a filler neck, and a cap which can be fastened to the filler neck by a threaded connection having a cap thread and a tank thread. The cap and the tank housing each have a respective stop, which stops permit a predetermined positioning of the cap in relation to the tank housing.

8 Claims, 7 Drawing Sheets

(56) References Cited

U.S. PATENT DOCUMENTS

| | | | |
|---|---|---|---|
| 4,099,639 A | | 7/1978 | Boxer |
| 4,721,220 A | * | 1/1988 | Northup .................. 215/307 |
| 5,086,943 A | * | 2/1992 | Poskie .................... 220/374 |
| 5,269,431 A | | 12/1993 | Sakata et al. |
| 5,493,863 A | | 2/1996 | Yanagi et al. |
| 5,676,270 A | | 10/1997 | Roberts |
| 5,687,863 A | * | 11/1997 | Kusz ....................... 215/216 |
| 2002/0056695 A1 | * | 5/2002 | Boulange et al. ......... 215/261 |
| 2003/0121877 A1 | * | 7/2003 | Brozell et al. ............ 215/220 |
| 2005/0091950 A1 | | 5/2005 | Weaver et al. |
| 2006/0157141 A1 | * | 7/2006 | von Hayn et al. ............ 141/95 |
| 2006/0213860 A1 | * | 9/2006 | Robinson ................. 215/216 |
| 2006/0273063 A1 | * | 12/2006 | Borger .................... 215/331 |
| 2011/0309048 A1 | * | 12/2011 | Briard et al. ............... 215/44 |

OTHER PUBLICATIONS

German Search Report for 10 2011 084 308.6 mailed Jul. 24, 2012.
Chinese First Office Action for Chinese Application No. 201180059234.8, mailed Dec. 31, 2014 (English translation only).

* cited by examiner

COMPENSATION TANK FOR HYDRAULIC MOTOR VEHICLE BRAKE SYSTEMS

CROSS REFERENCE TO RELATED APPLICATIONS

This application is the U.S. National Phase Application of PCT/EP2011/071224, filed Nov. 29, 2011, which claims priority to German Patent Application Nos. 10 2010 062 619.8, filed Dec. 8, 2010 and 10 2011 084 308.6, filed Oct. 12, 2011, the contents of such applications being incorporated by reference herein.

FIELD OF THE INVENTION

The invention relates to a compensation tank for hydraulic motor vehicle brake systems, comprising a tank housing having at least one pressure medium chamber which can be filled with pressure medium via a filler neck and having a cap which can be fastened to the filler neck by means of a threaded connection comprising a cap thread and a tank thread.

BACKGROUND OF THE INVENTION

A generic compensation tank is known, for example, from DE 37 34 421 A1, which is incorporated by reference.

As a result of modern engine compartment design the view of the engine and adjacent assemblies is frequently blocked by covering devices. Engine compartment covers generally leave open a view of only a few specified apertures for servicing. The caps (lids and screw fittings) for wiper fluid reservoir, engine oil and compensation tank, that is, the brake fluid reservoir, are usually located in these openings. Since the first glance into the engine compartment is initially oriented by these caps, greater importance is placed here on precise alignment of the lettering and symbols of the caps.

With the known compensation tanks, as a result of numerous tolerances between the tank thread and the cap thread, sealing elements and possible wet or dry seals, different final positions, and therefore obliquely positioned lettering and symbols, are possible after tightening.

SUMMARY OF THE INVENTION

Therefore an aim of the invention is to eliminate the disadvantages mentioned and to provide an improved compensation tank.

This is achieved according to an aspect of the invention with the cap and the tank each having a stop, which stops permit predetermined positioning of the cap in relation to the tank housing. A standardized, predetermined positioning of the cap and therefore of the lettering or symbols is thereby achieved with the desired tightening torque, and incorrect positioning can be ruled out.

BRIEF DESCRIPTION OF THE DRAWINGS

Further features, advantages and possible applications of the invention are apparent from the following description of exemplary embodiments and with reference to the drawing showing embodiments, in which drawing, in heavily schematized form:

FIG. 5b shows a section of the tank filler neck of the second exemplary embodiment according to FIG. 5a;

FIG. 6b shows a section of the cap of the second exemplary embodiment according to FIG. 6a;

DETAILED DESCRIPTION OF THE INVENTION

Figure 1:
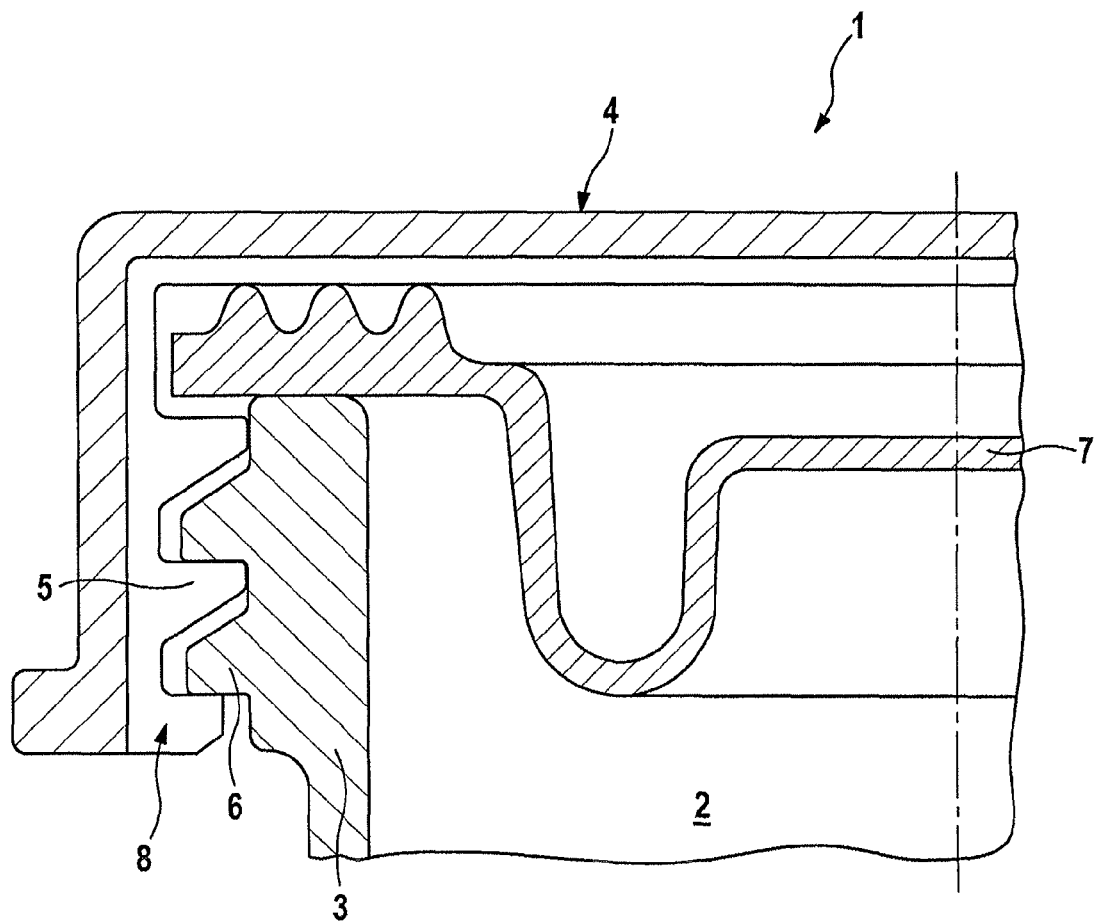
FIG. 1 shows a detail of a compensation tank according to the invention in section.

FIG. 1 shows a detail of a compensation tank 1 according to the invention which contains, in a tank housing 9 having at least one pressure medium chamber 2, for example brake fluid as a pressure medium for a hydraulic motor vehicle brake system, which compensation tank 1 is fastened and connected to a master cylinder (not shown) of the motor vehicle brake system. The tank housing 9 has a filler neck 3 via which the compensation tank 1 can be filled with brake fluid and which can be closed by means of a cap 4. The cap 4 is fastened to the filler neck 3 via a threaded connection comprising a cap thread 5 and a tank thread 6.

The function of the compensation tank 1 requires the pressure medium chamber 2 to be unpressurized. This means that pressure compensation must be able to take place between the pressure medium chamber 2 and the atmosphere, so that changes in the volume of the pressure medium which may occur, for example, through pressure medium loss or temperature changes of the pressure medium, can be compensated by an air exchange.

At the same time, it must be prevented by means of a sealing element that pressure medium can escape from the compensation tank 1, for example with the motor vehicle in an inclined position. For this purpose the compensation tank 1 has as a sealing element a membrane 7, not described in detail, having a ventilation slit which is not essential to the invention. Other sealing elements for sealing and pressure compensation are therefore also possible within the scope of the invention.

One or more recesses 8 in the cap thread 5 enable air to be exchanged with the atmosphere. According to an embodiment not illustrated, the recesses 8 may also be formed in the tank thread 6.

Common to the following exemplary embodiments is that the cap 4 and the tank housing 9 each have a respective stop 10, 11, which stops permit a predetermined positioning of the cap 4 in relation to the tank housing 9. A standardized, predetermined and reproducible positioning of the cap 4, and therefore of the lettering or symbols formed thereon, is thereby achieved with the desired tightening torque and incorrect positioning can be ruled out.

Figure 2:
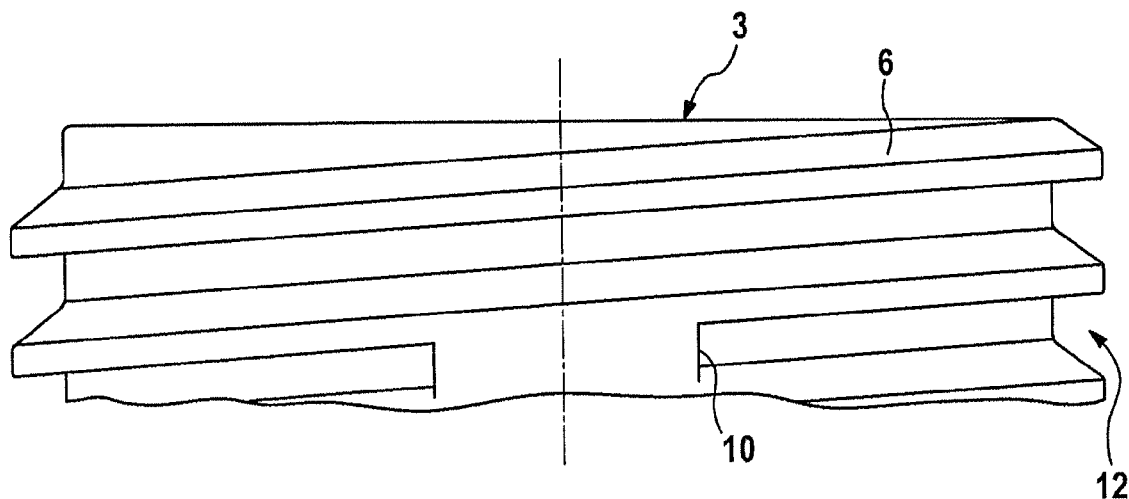
FIG. 2 shows a front view of a tank filler neck of a first exemplary embodiment.
Figure 3:
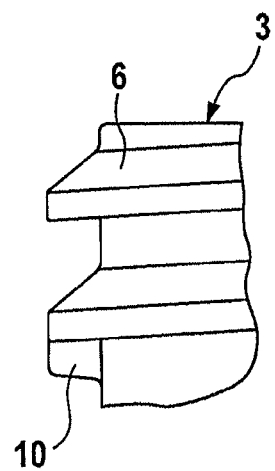
FIG. 3 shows a detail of a side view of the tank filler neck according to FIG. 2.
Figure 4:
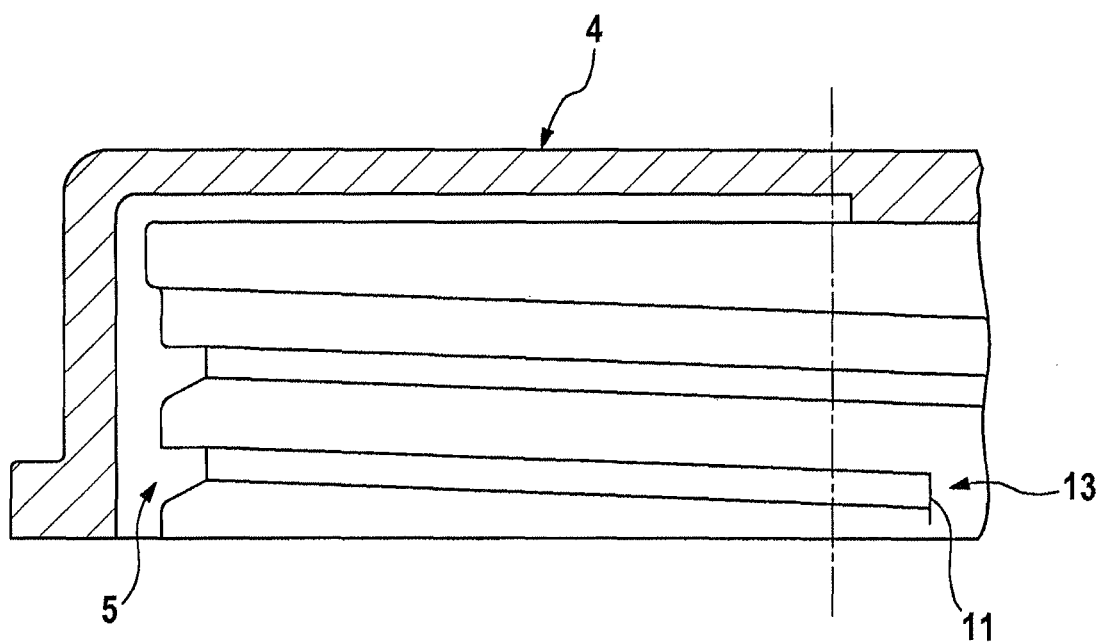
FIG. 4 shows a detail of a cap of the first exemplary embodiment in section.

According to the first exemplary embodiment shown in FIGS. 2, 3 and 4, the stops 10, 11 are arranged in the region of the cap thread 5 and the tank thread 6.

As is apparent from FIGS. 2 and 3, which show a front view and a side view of the filler neck 3, in this case the stop 10 of the tank thread 6 is arranged in a thread root 12. It can be seen, in particular, from FIG. 3 that the stop 10 is formed by filling the thread root 12 with the tank material.

By contrast, the corresponding stop 11 of the cap thread 5, which comes into abutment with the stop 10 of the tank thread 6 in the predetermined position of the cap 4, is formed in that a thread start 13 is configured without a thread lead-in and with a blunt end face.

Figure 5A:
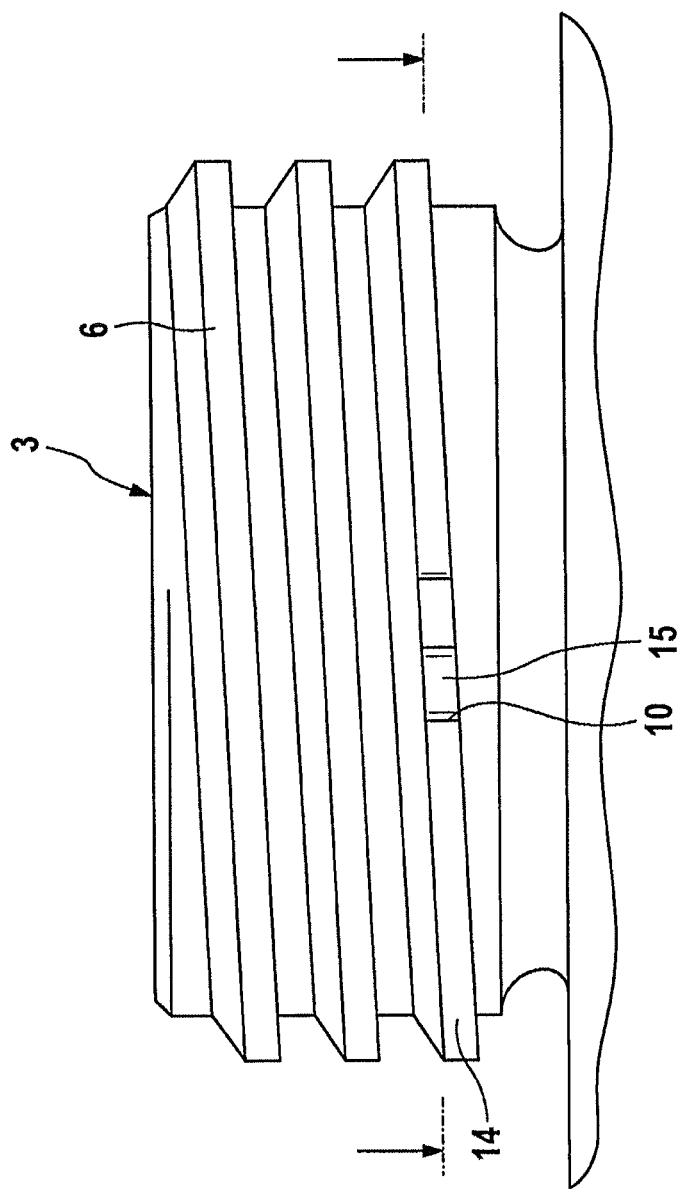
FIG. 5a shows a front view of a tank filler neck of a second exemplary embodiment of a compensation tank according to the invention.
Figure 5B:
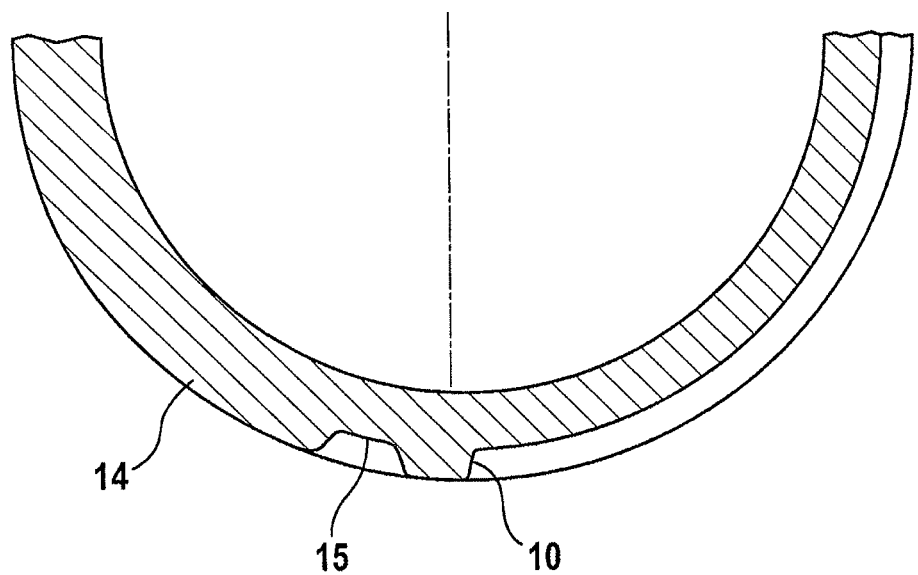

The second exemplary embodiment, shown in. FIGS. 5a and 5b, also has the stops 10, 11 in the region of the cap and tank threads 5, 6. Contrary to the first exemplary embodiment, however, the stop 10 of the tank thread 6 is arranged on the thread, that is, on a thread turn 14, against which stop 10 the stop 11, arranged in a thread root, of the cap thread 5 (not shown) comes into abutment in the predetermined position of the cap 4.

Figure 6A:
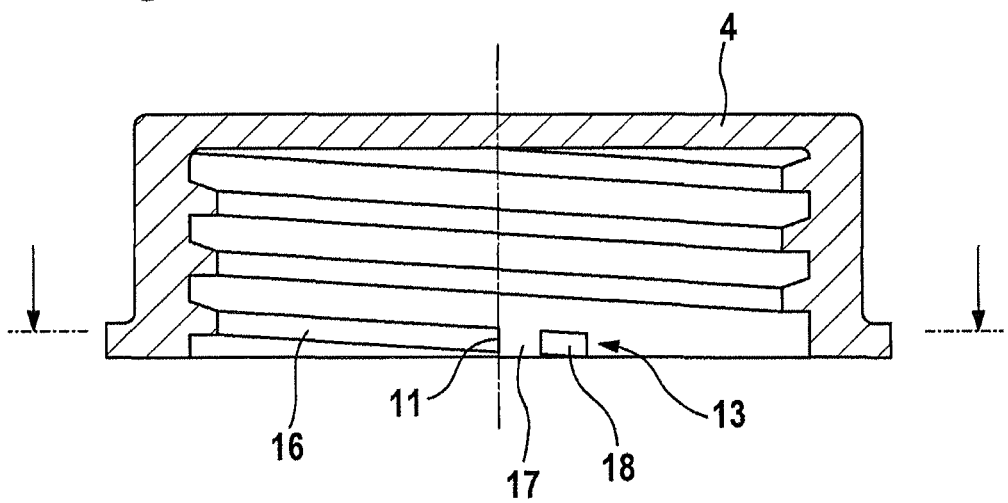
FIG. 6a shows a cap of a third exemplary embodiment of a compensation tank according to the invention in section.
Figure 6B:
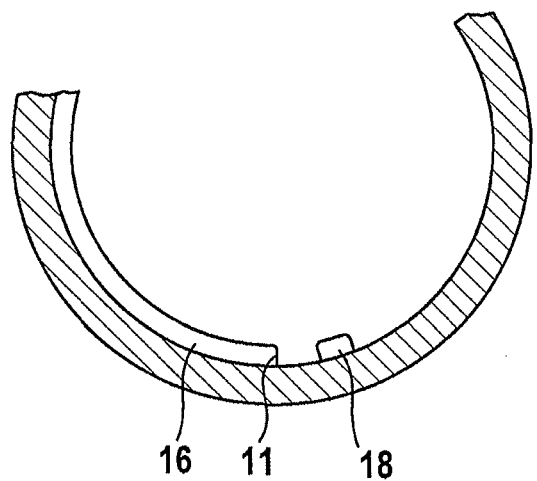

It is further apparent that the thread turn 14 has a recess 15 into which snaps a projection (not shown) of the thread root of the cap 4, which projection carries the stop 11. The stop 10 is formed as a side face of the recess 15. Both a haptic and an acoustic latching after reaching the desired tightening torque and the desired position of the cap 4 can thereby be indicated. FIGS. 6a and 6b show a third exemplary embodiment, which largely corresponds to the first exemplary embodiment as shown in FIGS. 2 to 4. As can be seen, a thread turn 16 starting from the thread start 13 has a recess 17, so that a projection 18 is produced. The stop 11 is formed on a side face of the recess 17, as shown in FIGS. 6a and 6b.

Figure 7A:
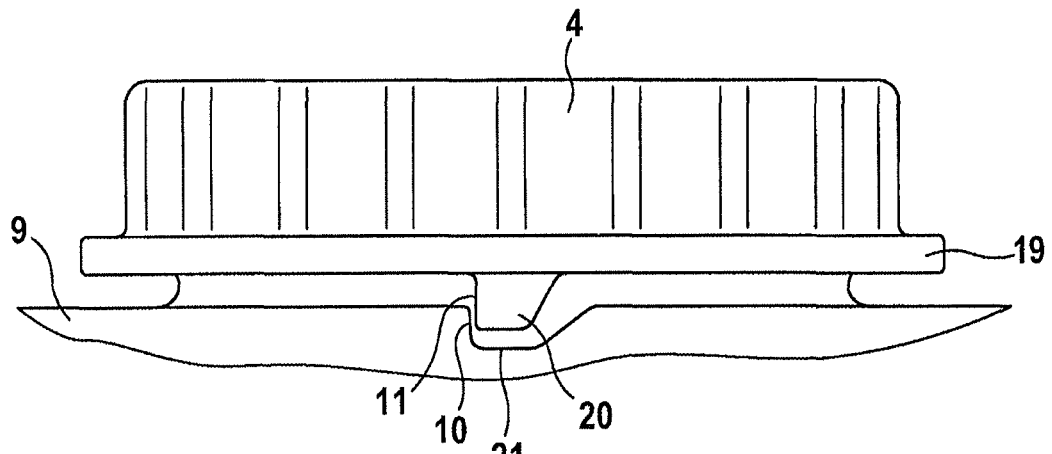
FIG. 7a shows a detail of a fourth exemplary embodiment of a compensation tank according to the invention.
Figure 7B:
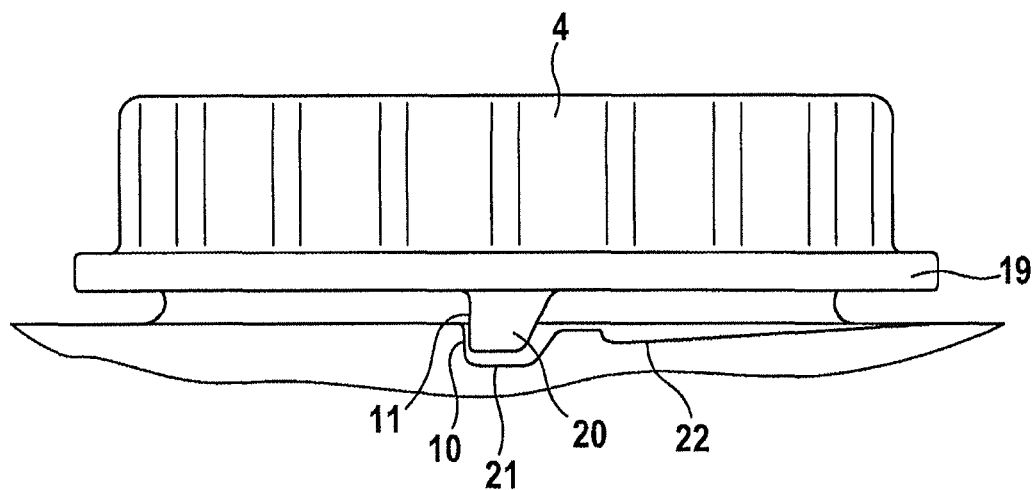
FIG. 7b shows a detail of a fifth exemplary embodiment of a compensation tank according to the invention.

According to the fourth and fifth exemplary embodiments shown in FIGS. 7a and 7b, the stops 10 and 11 may also be arranged on a cap edge 19 or on a projection 20 formed thereon, and on the tank housing 9, or as a side wall of a recess 21 of the tank housing 9 in the region of the filler neck 3.

The exemplary embodiment shown in FIG. 7b additionally has a lead-in 22 ahead of the recess 21, which indicates haptic and acoustic latching after reaching the required torque.

The exemplary embodiments described have the advantage that, even in the case of an axial seal, it is possible to obtain specifically aligned lettering and symbols by means of a simple and low-cost modification to the tank housing 9 and to the cap 4.

It should be mentioned here that the stop 10 in the tank thread 6 must not necessarily be provided on a lower thread turn 14 or in a lower thread root 12. It may also be arranged on an upper or middle thread turn or in an upper or middle thread root.

In addition, the recess 15, 17 provides security against unintended release of the cap 4.

To further improve the functioning of the cap 4, the recess 8 of the cap thread 5 is arranged against the direction of travel, so that after the stops 10, 11 of the cap and tank threads 5, 6 have abutted one another and the projections 18 have snapped into the recesses 15, 17, no leakage or loss of fluid is possible during dynamic changes of the fluid in the compensation tank 1, especially during the braking process.

List of References
  1 Compensation tank
  2 Pressure medium chamber
  3 Filler neck
  4 Cap
  5 Cap thread
  6 Tank thread
  7 Membrane
  8 Recess
  9 Tank housing
  10 Stop
  11 Stop
  12 Thread root
  13 Thread start
  14 Thread turn
  15 Recess
  16 Thread turn
  17 Recess
  18 Projection
  19 Cap edge
  20 Projection
  21 Recess
  22 Lead-in

The invention claimed is:

1. A compensation tank for hydraulic motor vehicle brake systems, comprising a tank housing having at least one pressure medium chamber which can be filled with pressure medium via a filler neck, a cap which can be fastened to the filler neck by a threaded connection comprising a cap thread and a tank thread, and
    a compensation means between the cap thread and the tank thread for ensuring that the tank is unpressurized;
    wherein the cap and the tank housing each have a respective stop, which stops permit a predetermined positioning of the cap in relation to the tank housing.

2. The compensation tank as claimed in claim 1, wherein the stops are arranged in the region of the cap and tank threads.

3. A compensation tank for hydraulic motor vehicle brake systems, comprising a tank housing having at least one pressure medium chamber which can be filled with pressure medium via a filler neck, and a cap which can be fastened to the filler neck by a threaded connection comprising a cap thread and a tank thread,
    wherein the cap and the tank housing each have a respective stop, which stops permit a predetermined positioning of the cap in relation to the tank housing, and
    wherein the stop of the tank thread is arranged in a thread root, against which a stop of the cap thread comes into abutment in the predetermined position of the cap the stop of the cap thread being formed in that a thread start is configured without a lead-in and with a blunt end face.

4. A compensation tank for hydraulic motor vehicle brake systems, comprising a tank housing having at least one pressure medium chamber which can be filled with pressure medium via a filler neck, a cap which can be fastened to the filler neck by a threaded connection comprising a cap thread and a tank thread, and
    a compensation means for ensuring that the tank is unpressurized;
    wherein the cap and the tank housing each have a respective stop, which stops permit a predetermined positioning of the cap in relation to the tank housing, and wherein the stop of the tank thread is arranged on a thread turn, against which a stop of the cap thread arranged in a thread root comes into abutment in the predetermined position of the cap.

5. The compensation tank as claimed in claim 4, wherein the thread turn has a recess into which a projection of the thread root snaps.

6. The compensation tank as claimed in claim 1, wherein the stops are arranged on a projection of a cap edge and in a recess of the tank housing in the region of the filler neck.

7. A compensation tank for hydraulic motor vehicle brake systems, comprising a tank housing having at least one pressure medium chamber which can be filled with pressure medium via a filler neck, and a cap which can be fastened to the filler neck by a threaded connection comprising a cap thread and a tank thread, wherein the cap and the tank housing each have a respective stop, which stops permit a predetermined positioning of the cap in relation to the tank housing, and wherein the stops are arranged on a projection of a cap edge and in a recess of the tank housing in the region of the filler neck, and wherein a lead-in is provided ahead of the recess.

8. The compensation tank as claimed in claim 1 wherein the compensation means comprises a recess formed in at least one of the cap thread and the tank thread.

* * * * *